United States Patent
Miwa et al.

(10) Patent No.: US 8,884,967 B2
(45) Date of Patent: Nov. 11, 2014

(54) MOBILE COMMUNICATION DEVICE, DISPLAY CONTROL METHOD, AND DISPLAY CONTROL PROGRAM

(75) Inventors: Tomoaki Miwa, Daito (JP); Shunsuke Nagata, Daito (JP)

(73) Assignee: KYOCERA Corporation, Kyoto (JP)

( * ) Notice: Subject to any disclaimer, the term of this patent is extended or adjusted under 35 U.S.C. 154(b) by 228 days.

(21) Appl. No.: 13/498,578

(22) PCT Filed: Sep. 27, 2010

(86) PCT No.: PCT/JP2010/066706
§ 371 (c)(1),
(2), (4) Date: Mar. 27, 2012

(87) PCT Pub. No.: WO2011/037231
PCT Pub. Date: Mar. 31, 2011

(65) Prior Publication Data
US 2012/0184246 A1  Jul. 19, 2012

(30) Foreign Application Priority Data
Sep. 28, 2009 (JP) ................................. 2009-222485

(51) Int. Cl.
G06T 11/20 (2006.01)
H04M 1/725 (2006.01)

(52) U.S. Cl.
CPC ................................ *H04M 1/72544* (2013.01)
USPC ........... 345/440; 345/473; 345/173; 709/206; 709/102; 455/90.3; 455/550.1; 455/575.1; 455/575.3; 455/575.4

(58) Field of Classification Search
USPC ............... 345/173, 440, 473; 455/566, 575.4, 455/90.3, 550.1, 575.1, 575.3; 379/433.01; 715/706; 709/206, 102
See application file for complete search history.

(56) References Cited

U.S. PATENT DOCUMENTS

2003/0202656 A1* 10/2003 Ikeuchi et al. ................. 379/419
2003/0203747 A1* 10/2003 Nagamine ................ 455/575.3
(Continued)

FOREIGN PATENT DOCUMENTS

JP 2002-300241 A 10/2002
JP 2004-007488 A 1/2004
(Continued)

OTHER PUBLICATIONS

International Search Report dated Oct. 26, 2010, issued for International Application No. PCT/JP2010/066706.
(Continued)

*Primary Examiner* — Shaheda Abdin
(74) *Attorney, Agent, or Firm* — Procopio, Cory, Hargreaves & Savitch LLP

(57) ABSTRACT

A mobile phone including upper and lower portions, a flash memory to store images, a selecting portion to select a target image from the stored images, a closed state detection portion to detect a closed state, and a display control portion to control display of an image to display an image of an idle screen including in a background image the target image selected by the selecting portion when standing by, and the display control portion displays, in response to the change from a state in which the closed state is detected by the closed state detection portion to a state in which the closed state is not detected while the image of the idle screen is being displayed, a new idle screen that includes in the background image a new target image selected by the selecting portion subsequent to the background image included in the idle screen.

15 Claims, 6 Drawing Sheets

(56) References Cited

U.S. PATENT DOCUMENTS

| | | |
|---|---|---|
| 2004/0014485 A1 | 1/2004 | Sugauchi et al. |
| 2006/0284855 A1* | 12/2006 | Shintome ................. 345/173 |
| 2008/0167098 A1* | 7/2008 | Mizuta et al. ............. 455/575.4 |
| 2009/0203356 A1 | 8/2009 | Li et al. |

FOREIGN PATENT DOCUMENTS

| | | |
|---|---|---|
| JP | 2005-130005 A | 5/2005 |
| JP | 2006-319561 A | 11/2006 |
| JP | 2007-019611 A | 1/2007 |
| JP | 3886409 B2 | 2/2007 |
| JP | 2007-080219 A | 3/2007 |
| JP | 2008-060815 A | 3/2008 |
| JP | 2008-158802 A | 7/2008 |
| JP | 2008-301019 A | 12/2008 |
| JP | 2009-130734 A | 6/2009 |

OTHER PUBLICATIONS

Notice of Ground of Rejection issued in a corresponding Japanese application No. 2009-222485, dated Oct. 15, 2013.

* cited by examiner

F I G. 2
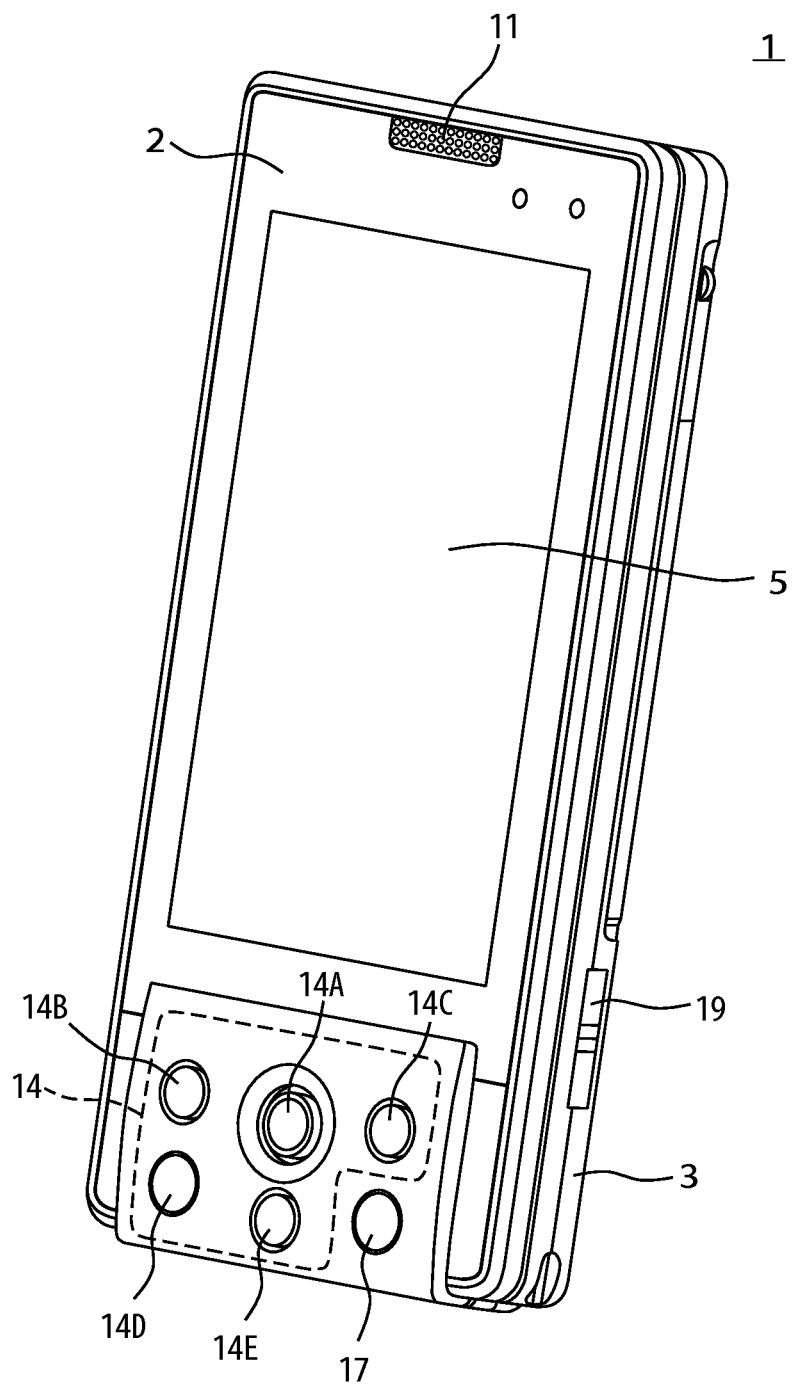

F I G. 4
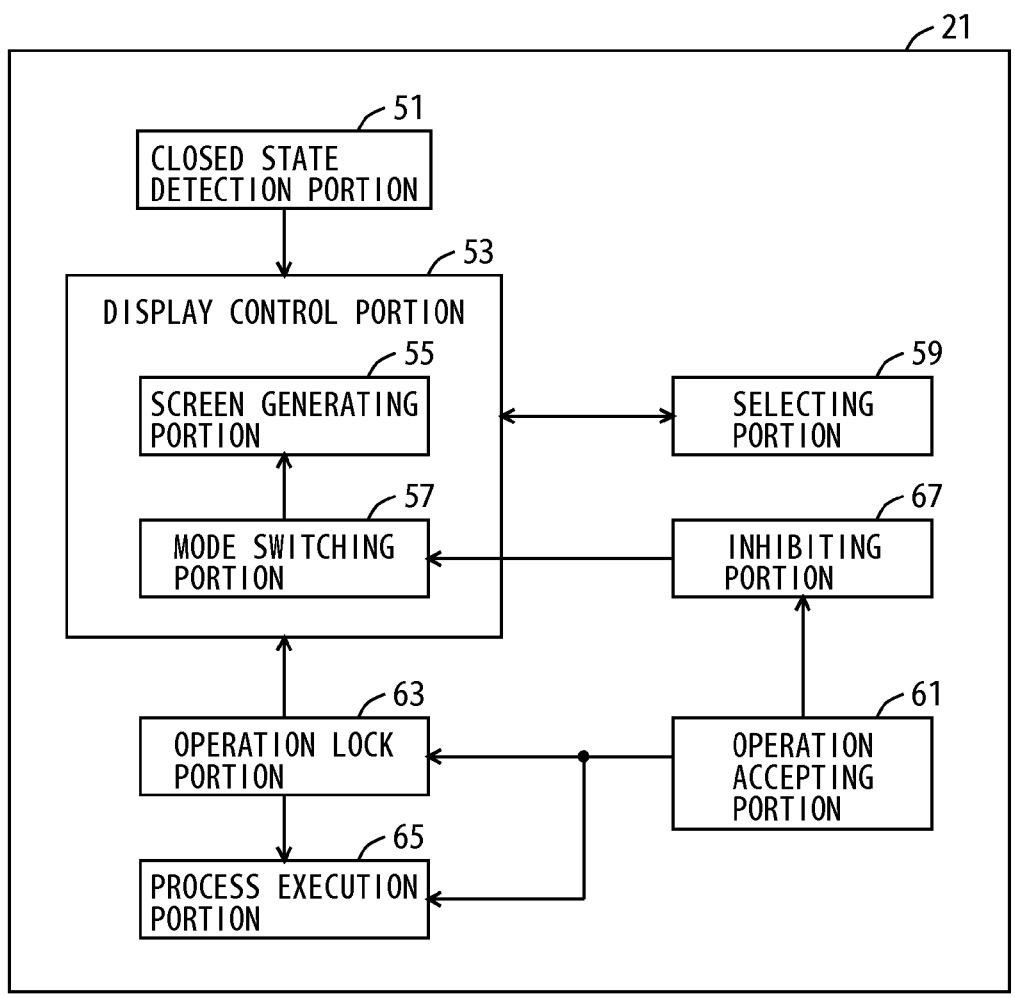

MOBILE COMMUNICATION DEVICE, DISPLAY CONTROL METHOD, AND DISPLAY CONTROL PROGRAM

TECHNICAL FIELD

The present invention relates to a mobile communication device, a display control method, and a display control program, and more specifically, to a mobile communication device capable of changing its state to an opened state and to a closed state, and a display control method and a display control program to be executed by such mobile communication device.

BACKGROUND ART

A mobile communication device as represented by a mobile phone, when it is not being used and is standing by, displays an idle screen on a liquid crystal display (LCD) in order to notify a user that it is in a standby state. As for the idle screens, there are those that allow the user to set an image of his choice in the background and to make the screen an original of that user. The images which can be set as a background for the idle screen can be selected by the user from the images stored in a storage device such as a flash memory provided in the mobile phone. When the image being set as the idle screen is to be altered, however, a predetermined operation must be performed, making the operation complicated. In particular, a user with no knowledge of such an operation can neither set an image of his choice to be the idle screen nor alter it.

On the other hand, the technology is known in which the images are switched when a mobile phone changes from a folded state to an open state or when it changes from the open state to the folded state. In addition, a portable terminal is known in which the images are switched when the number of times that a folding mechanism has been used reaches a predetermined number of times or when a predetermined time period has elapsed.

Since a conventional portable terminal can be opened and closed by the folding mechanism, however, it is incapable of displaying the idle screen in its closed state. Consequently, there is the problem that this technology cannot be applied to a mobile phone that is capable of displaying the idle screen in its closed state. For instance, there are cases in which the shape is changed in the middle of the operation, and in such cases, there is the problem that the images become switched in the middle of the operation.

DISCLOSURE OF THE INVENTION

Problems to be Solved by the Invention

The present invention is made to solve the above-described problem, and an object of the present invention is to provide a mobile communication device which is capable of altering an image included in an idle screen by an easy operation.

Another object of the present invention is to provide a display control method which is capable of altering an image included in an idle screen by an easy operation.

A further object of the present invention is to provide a display control program which is capable of altering an image included in an idle screen by an easy operation.

Means for Solving the Problems

In order to achieve the above-described objects, according to one aspect of the present invention, a mobile communication device in which an upper portion and a lower portion open and close to allow the state to change to an opened state and to a closed state includes an image storage portion to store a plurality of images, a selecting portion to select a target image from the plurality of images stored, a closed state detection portion to detect the closed state, and a display control portion to control display of an image to display an image of an idle screen including the target image selected by the selecting portion when standing by, wherein the display control portion displays, in response to the change from a state in which the closed state is detected by the closed state detection portion to a state in which the closed state is not detected while the image of the idle screen is being displayed, a new idle screen that includes a new target image selected by the selecting portion subsequent to the target image included in the idle screen.

According to another aspect of the present invention, a display control method is to be executed by a mobile communication device in which an upper portion and a lower portion open and close to allow the state to change to an opened state and to a closed state, wherein the mobile communication device includes an image storage portion to store a plurality of images, and the display control method includes the steps of selecting a target image from the plurality of images stored, detecting the closed state, and displaying, in response to the change to a state in which the closed state is not detected in the step of detecting the closed state when the closed state is being detected in the step of detecting the closed state and while an image of an idle screen including the target image selected in the selecting step is being displayed, a new idle screen that includes a new target image selected subsequent to the target image included in the idle screen in the selecting step.

According to a further aspect of the present invention, a display control program is to be executed by a computer that controls a mobile communication device in which an upper portion and a lower portion open and close to allow the state to change to an opened state and to a closed state, wherein the mobile communication device includes an image storage portion to store a plurality of images, and wherein the display control program causes the computer to execute the steps of selecting a target image from the plurality of images stored, detecting the closed state, and displaying, in response to the change to a state in which the closed state is not detected in the step of detecting the closed state when the closed state is being detected in the step of detecting the closed state and while display of an image of an idle screen including the target image selected in the selecting step is being displayed, a new idle screen that includes a new target image selected subsequent to the target image included in the idle screen in the selecting step.

BRIEF DESCRIPTION OF THE DRAWINGS

FIG. 2 is a perspective view showing the external appearance of the mobile phone in a closed state according to one embodiment of the present invention.

FIG. 4 is a block diagram showing one example of a function provided in a main control portion.

Figure 1:
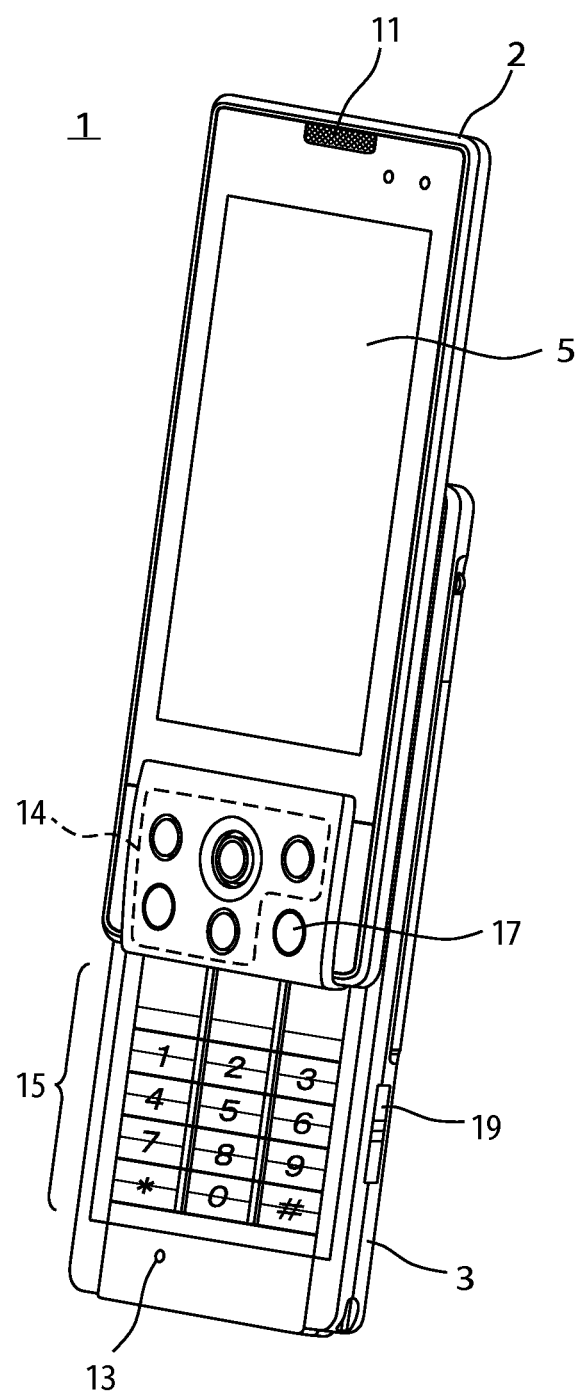
FIG. 1 is a perspective view showing the external appearance of a mobile phone in an opened state according to one embodiment of the present invention.

DESCRIPTION OF REFERENCE CHARACTERS 1 mobile phone, 2 upper portion, 3 lower portion, 5 LCD, 11 speaker, 13 microphone, 14 operation key group, 14A joystick, 14B-14E menu keys, 15 alphanumeric key group, 17 power key, 19 side key, 21 main control portion, 21 control portion, 22 wireless circuit, 22A antenna, 23 codec portion, 24 camera, 25 operation portion, 26 vibration portion, 27 card I/F, 27A memory card, 28 sound control portion, 29 closed sensor, 31 flash memory, 51 closed state detection portion, 53 display control portion, 55 screen generating portion, 57 mode switching portion, 59 selecting portion, 61 operation accepting portion, 63 operation lock portion, 65 process execution portion, 67 inhibiting portion.

BEST MODES FOR CARRYING OUT THE INVENTION

The embodiments of the present invention will be described below with reference to the drawings. In the following description, the same or corresponding parts are denoted by the same reference characters. Their names and functions are also the same. Thus, the detailed description thereof will not be repeated.

In the following description, a mobile phone 1 will be described as an example of a mobile communication device. FIGS. 1 and 2 are perspective views showing the external appearance of the mobile phone according to one embodiment of the present invention. Moreover, the broken lines in the drawings have been provided for the purpose of description and do not actually exist. Mobile phone 1 is capable of changing the shape to an opened state and to a closed state. FIG. 1 shows an overview of the mobile phone in the opened state, while FIG. 2 shows an overview of the mobile phone in the closed state. With reference to FIGS. 1 and 2, mobile phone 1 includes an upper portion 2 and a lower portion 3. Upper portion 2 is coupled with lower portion 3 in a slidable manner in the longitudinal direction such that its rear face faces the front face of lower portion 3. FIG. 1 shows mobile phone 1 being opened by having upper portion 2 slide in relation to lower portion 3. When mobile phone 1 is in its closed state, the rear face of upper portion 2 overlaps the front face of lower portion 3.

On the front face of upper portion 2, a liquid crystal display (LCD) 15, an operation key group 14, a power key 17, and a speaker 11 serving as a receiver are disposed. Power key 17 is a button switch for inputting the operation to switch the main power source of mobile phone 1 between ON and OFF. In order to prevent an erroneous operation, the surface of power key 17, in other words, the portion to be pressed down by a finger of the user, is set such that it is slightly lower than the surface of upper portion 2. Operation key group 14 includes a joystick 14A and menu keys 14B to 14E. Joystick 14A switches between ON and OFF the five switches for accepting the five operations of up, down, left, right, and pressing down. Moreover, in order to facilitate the operation, the surface of upper portion 2 is depressed in the vicinity of joystick 14A and a protruded portion of joystick 14A is set such that it is higher than the surface of upper portion 2. Menu keys 14B to 14E switch between ON and OFF the switches to which predetermined operations are assigned.

Moreover, although the example in which mobile phone 1 is provided with LCD 5 is illustrated here, an organic EL (Electro Luminescence) display and the like may be used in place of LCD 5. In addition, in place of joystick 14A, the combination of a cross-key having four switches for accepting operations to instruct the four directions of up, down, left, and right, respectively, and a decide button having a switch for accepting the operation of pressing down may be used.

When mobile phone 1 is in the opened state, a portion of the front face of lower portion 3 is exposed. On the portion of lower portion 3 where the front face is exposed, an alphanumeric key group 15 including the ten-keys and a microphone 13 are arranged. In addition, a side key 19 is arranged on a lateral face of lower portion 3.

When mobile phone 1 is in its closed state, alphanumeric key group 15 is covered and hidden by upper portion 2. Thus, the user is unable to operate alphanumeric key group 15. On the other hand, operation key group 14, power key 17, and side key 19 are exposed on the outside when mobile phone 1 is in its closed state. Consequently, the user is able to operate operation key group 14, power key 17, and side key 19 while mobile phone 1 is in its closed state.

Figure 3:
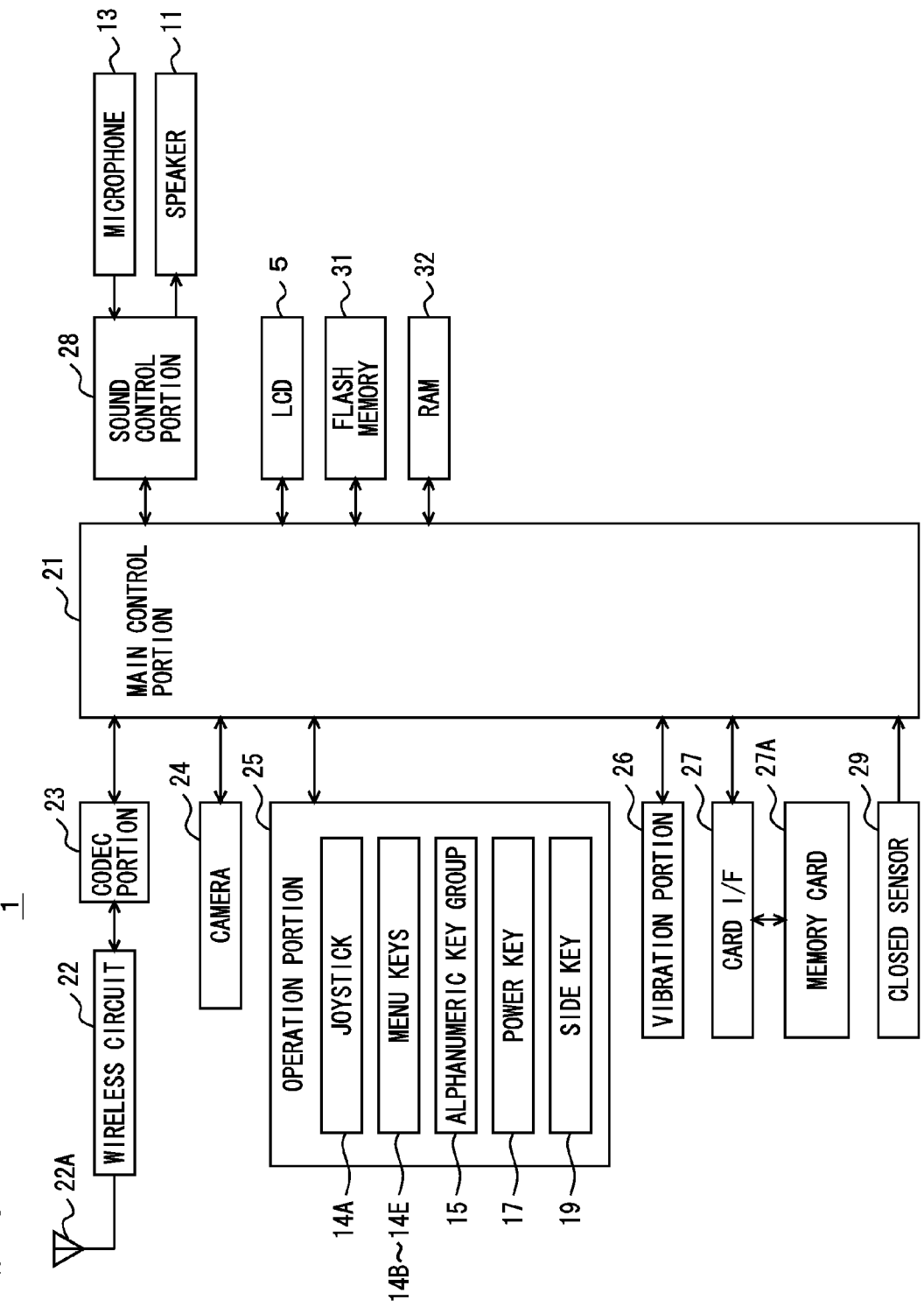
FIG. 3 is a block diagram showing one example of a hardware arrangement of the mobile phone according to the present embodiment.

FIG. 3 is a block diagram showing one example of a hardware arrangement of the mobile phone according to the present embodiment. With reference to FIG. 3, mobile phone 1 includes a main control portion 21 for controlling the entire mobile phone 1, a wireless circuit 22 connected to an antenna 22A, a codec portion 23 for encoding or decoding voice data, a sound control portion 28 for processing the voice data, a camera 24, an operation portion 25, a vibration portion 26 for announcing an incoming call, a flash memory 31 for storing a program and the like to be executed by main control portion 21, a RAM (Random Access Memory) 32 to be used as a work area of main control portion 21, a card interface (I/F) 27, and a closed sensor 29.

Wireless circuit 22 is controlled by main control portion 21 to communicate with a wireless base station connected to a communication network. More specifically, wireless circuit 22 receives the input of a radio signal received by antenna 22A and outputs an audio signal obtained by demodulating the radio signal to codec portion 23. In addition, wireless circuit 22 receives the input of an audio signal from codec portion 23 and outputs a radio signal obtained by modulating the audio signal to antenna 22A. Codec portion 23 decodes the audio signal inputted from wireless circuit 22, converts the decoded digital audio signal into analog form, and outputs it to sound control portion 28. Moreover, codec portion 23 receives the input of the analog audio signal from sound control portion 28, converts the audio signal into digital form, encodes it, and then outputs the encoded audio signal to wireless circuit 22.

Sound control portion 28 is connected to microphone 13 and receives the input of an analog audio signal which is outputted by microphone 13 upon collecting sound. Sound control portion 28 outputs the audio signal inputted from microphone 13 to codec portion 23. In addition, sound control portion 28 receives the input of the audio signal from codec portion 23 and outputs the audio signal inputted from codec portion 23 to speaker 11.

Moreover, wireless circuit 22 is capable of data communication with a wireless base station. In particular, wireless circuit 22 is capable of communicating via a wireless base station with an electronic mail server connected to the wireless base station. Wireless circuit 22 receives an electronic mail transmitted from the electronic mail server and outputs it to main control portion 21. Furthermore, wireless circuit 22 transmits the electronic mail inputted from main control portion 21 to the electronic mail server. Main control portion 21 stores the electronic mail transmitted to and received from the electronic mail server in flash memory 31.

Operation portion 25 is connected to the switches that are switched between ON and OFF by joystick 14A, menu keys 14B to 14E, alphanumeric key group 15, power key 17, and side key 19, respectively, and detects the ON and the OFF of each of the switches. When joystick 14A, menu keys 14B to 14E, alphanumeric key group 15, power key 17, and side key 19 are operated by the user, the corresponding switches are switched from OFF to ON.

Closed sensor 29 includes a switch provided on the back side of a menu key 14E of upper portion 2 and a magnet disposed next to microphone 13 of lower portion 3. The magnet is disposed at a position which becomes closest in distance from the switch when mobile phone 1 is in its closed state. The switch is turned ON when the magnet closes in within a prescribed distance and is turned OFF when the magnet moves away farther than a prescribed distance. Consequently, closed sensor 29 is turned ON when mobile phone 1 is in its closed state and is turned OFF when it is no longer in its closed state. Thus, closed sensor 29 detects the closed state of mobile phone 1. Moreover, although a switch which switches between ON and OFF by the approximation of a magnet is used here, a contact-type switch such as a button switch may be used, or a contactless-type switch such as a photointerrupter may be used.

Card I/F 27 has a removable memory card 27A attached thereto. Memory card 27A has a non-volatile memory such as a flash memory and is capable of storing a program. Main control portion 21 is capable of accessing memory card 27A via card I/F 27. Moreover, although the example is described here in which a program to be executed in main control portion 21 is stored in flash memory 31, the program may be stored in memory card 27A, and the program may be read from memory card 27A and be executed in main control portion 21. The storage media for storing the program is not limited to memory card 27A and may also be a flexible disk, a cassette tape, an optical disk [CD-ROM (Compact Disc-ROM)/MO (Magnetic Optical Disc)/MD (Mini Disc)/DVD (Digital Versatile Disc)], an optical card, and a semiconductor memory such as a mask ROM, an EPROM, an EEPROM, and the like. In addition, main control portion 21 may download a program from a computer connected to the Internet via wireless circuit 22 and execute that program. The program referred to herein includes not only a program directly executable by main control portion 21 but also a source program, a compressed program, an encrypted program, and the like.

Camera 24 is provided on the rear side of lower portion 3 and has a photoelectric transducer such as a CMOS (Complementary Metal Oxide Semiconductor) sensor and a lens, and the light focused by the lens forms an image in the CMOS sensor and the CMOS sensor causes the received light to undergo a photoelectric transfer and outputs image data to main control portion 21. Camera 24 is controlled by main control portion 21, starts the image pickup according to an instruction from main control portion 21, and outputs the obtained still picture data or video data to main control portion 21. Main control portion 21 displays the still picture data or the video data outputted by camera 24 on LCD 5 or encodes the still picture data or the video data by the compression encoding method and stores it in flash memory 31 or in memory card 27A attached to card I/F 27.

Flash memory 31 stores an image and a program to be executed by main control portion 21. The image stored by flash memory 31 includes an image obtained by image pickup by camera 24, an image received along with the electronic mail received from wireless circuit 22, and an image stored in memory card 27A attached to card I/F 27. In addition, in the case where mobile phone 1 has the function to communicate by cable or by wireless with another mobile phone or with an electronic equipment such as a computer, an image received from the electronic equipment is included.

FIG. 4 is a block diagram showing one example of a function provided in main control portion 21. The function shown in FIG. 4 is formed in main control portion 21 as main control portion 21 executes a program stored in flash memory 31. With reference to FIG. 4, main control portion 21 includes a closed state detection portion 51 to detect whether the shape of mobile phone 1 is in the closed state or not, a display control portion 53 to control display on LCD 5, a selecting portion 59 to select one from a plurality of images, an operation accepting portion 61 to accept an operation by a user, an operation lock portion 63 to render a predetermined prescribed operation invalid, a process execution portion 65 to execute a process according to an operation, and an inhibiting portion 67.

Closed state detection portion 51 is connected to closed sensor 29 and detects whether the shape of mobile phone 1 is in the closed state or not based on an output of closed sensor 29. Closed state detection portion 51 detects the closed state while the output of closed sensor 29 is ON and detects not being in the closed state while the output of closed sensor 29 is OFF. When closed state detection portion 51 detects the change from the opened state to the closed state, in other words, when the output from closed sensor 29 switches from OFF to ON, it outputs a closed state transition signal to display control portion 53. In addition, when closed state detection portion 51 detects the change from the closed state to a non-closed state, in other words, when the output from closed sensor 29 switches from ON to OFF, it outputs an opened state transition signal to display control portion 53.

Display control portion 53 controls LCD 5 to display an image on LCD 5. Display control portion 53 includes a screen generating portion 55 and a mode switching portion 57.

Screen generating portion 55 generates an idle screen displayed first by mobile phone 1 when it enters into a standby state. The standby state is, for instance, the state where wireless circuit 22 awaits the reception for a call to be transmitted or the reception of an electronic mail from a base station. The idle screen includes a background image. The idle screen includes information selected by the user from a variety of information based on the setting by the user. The variety of information, for instance, include a watch, a calendar, a news telop, an image (PICT) for indicating the setting status of the mobile phone or for calling up a prescribed function, and so on.

Mode switching portion 57 switches between a display mode and a shuffle mode. The display mode includes a normal mode of displaying an image and a power saving mode of interrupting the display of the image, and mode switching portion 57 switches the display mode to either one of the normal mode and the power saving mode. The power saving mode has smaller power consumption than the normal mode. Mode switching portion 57 switches the display mode to the power saving mode when mobile phone 1 is in a sleep mode and switches the display mode to the normal mode when not in the sleep mode. Mobile phone 1 enters into the sleep mode, for instance, when it is in a standby state and when an operation by the user had not been accepted for a prescribed time period, and it recovers from the sleep mode when the operation by the user is accepted. The operation by the user includes the operation to cause mobile phone 1 to attain the opened state.

The shuffle mode sets whether or not to make the alteration of the background image included in the idle screen valid. When the shuffle mode is set to ON, the alteration of the background image is set to valid, and when the shuffle mode is set to OFF, the alteration of the background image is set to invalid. Mode switching portion 57 switches the shuffle mode to either one of ON and OFF. Mode switching portion 57 displays a setting screen for setting the shuffle mode on LCD 5 and sets the shuffle mode to either one of ON and OFF according to the operation inputted by the user using operation portion 25. In addition, while the shuffle mode is set to ON, mode switching portion 57 switches the shuffle mode to OFF when a shuffle-invalid instruction is inputted from inhibiting portion 67 described below or when a remote lock signal is inputted from operation lock portion 63 described below. Mode switching portion 57 outputs the shuffle mode to screen generating portion 55.

Selecting portion 59 selects an image to be used as a background image included in an idle screen from a plurality of images stored in flash memory 31 or memory card 27A. Selecting portion 59 stores the selected image in a prescribed area of RAM 32. Here, selecting portion 59 stores a plurality of images in the order of their selection into RAM 32 in order to increase the speed of generation of the idle screen by screen generating portion 55 described below. Moreover, selecting portion 59 may use a random number and the like to select an image, for instance, so as not to select the same image successively.

Screen generating portion 55 generates the idle screen to be displayed by display control portion 53 and displays the generated idle screen on LCD 19. As described above, an idle screen is the screen synthesizing a background image and an image of information selected by the user from a variety of information. Screen generating portion 55 has the background image and the image of the information selected by the user respectively stored in RAM 32 and generates an image of the idle screen by synthesizing them.

When the shuffle mode inputted from mode switching portion 57 is OFF, screen generating portion 55 generates the idle screen including a predetermined background image. When the shuffle mode inputted from mode switching portion 57 is ON, screen generating portion 55 switches the background image included in the idle screen to the image which is next in order of selection by selecting portion 59 based on the fulfillment of prescribed conditions. The prescribed conditions here include a first condition and a second condition. The first condition is the condition which satisfies all of the following three conditions: that the display mode has been switched to the normal mode by mode switching portion 57; that an image of the idle screen is being displayed on LCD 19; and that an opened state transition signal is inputted from closed state detection portion 51. The second condition is the condition which satisfies all of the following three conditions: that the display mode has been switched to the power saving mode by mode switching portion 57; that the image last displayed on LCD 19 is an idle screen; and that the opened state transition signal is inputted from closed state detection portion 51.

The first condition and the second condition include the condition of having the opened state transition signal inputted from closed state detection portion 51 as a common condition. Consequently, in the state where the idle screen is being displayed on LCD 19 while mobile phone 1 is in its closed state, or thereafter when mobile phone 1 is no longer in the closed state after the display mode is altered to the power saving mode and the idle screen is no longer displayed, an idle screen with a background image which is different from that of the idle screen which had been displayed until then is displayed. In other words, when the user performs an opening and closing operation that changes the shape of mobile phone 1, the background image included in the idle screen is switched.

When the user presses down joystick 14A, menu keys 14B to 14E, alphanumeric key group 15, side key 19, and power key 17 provided in operation portion 25, operation accepting portion 61 outputs a key number given to the accepted key to operation lock portion 63 and process execution portion 65.

Process execution portion 65 executes the process assigned in advance to the key number inputted from operation accepting portion 61 on the condition that a lock instruction is not inputted from operation lock portion 63. The process to be executed by process execution portion 65 is a process that is executable by a conventional mobile phone, and although the details will not be described here, it includes a call process, a phone book editing process, an electronic mail editing, a transmission and reception process, and so on, for instance.

When a lock is set, operation lock portion 63 thereafter makes a prescribed operation inputted into operation portion 25 invalid, thereby rendering mobile phone 1 unusable. Here, the methods of setting a lock at operation lock portion 63 include the method of locking by the operation of closing the mobile phone (hereinafter referred to as "lock-when-closed"), the method of locking when no operation is inputted for a prescribed time period (hereinafter referred to as "auto-lock"), and the method of locking based on an incoming call from a predetermined phone number (hereinafter referred to as "remote-lock"). When a lock is to be set, operation lock portion 63 outputs the lock instruction to process execution portion 65. In addition, when the lock is set by a remote-lock, operation lock portion 63 outputs to display control portion 53 a remote lock signal indicating that the remote-lock is set to valid.

In the case where the shuffle mode is switched to ON by mode switching portion 57, when the idle screen is being displayed on LCD 19 by screen generating portion 55, if the user inputs into operation portion 25 the operation to set the background image included in the idle screen to a fixed background image, inhibiting portion 67 receives the input of that operation from operation accepting portion 61 and fixes the background image as well as outputs the shuffle-invalid instruction to mode switching portion 57. For instance, as a result of menu key 14B being pressed down, the message of "Would you like to fix the image of the idle screen?" and the button showing the characters "OK" and the button showing the characters "NO" are displayed, and when the button showing the characters "OK" is instructed by joystick 14A or by other key operation, the operation to set the background image included in the idle screen to the fixed background image is accepted. At the point when the operation to set the background image included in the idle screen to the fixed background image is accepted, inhibiting portion 67 sets the background image included in the idle screen being displayed on LCD 19 to the background image predetermined in relation to the idle screen as well as outputs the shuffle-invalid instruction to mode switching portion 57.

Figure 5:
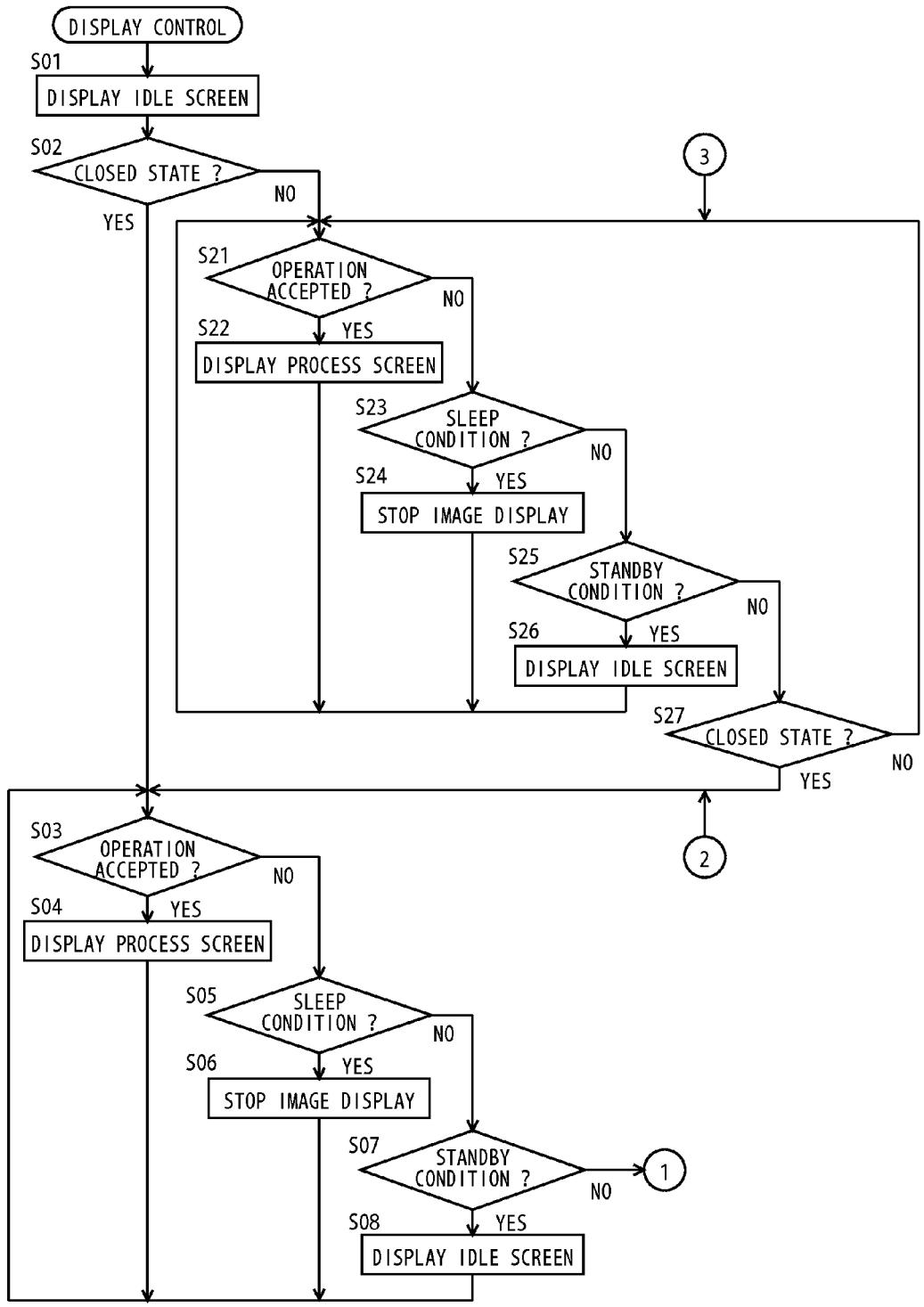
FIG. 5 is a first flow chart showing one example of the flow of a display control process.
Figure 6:
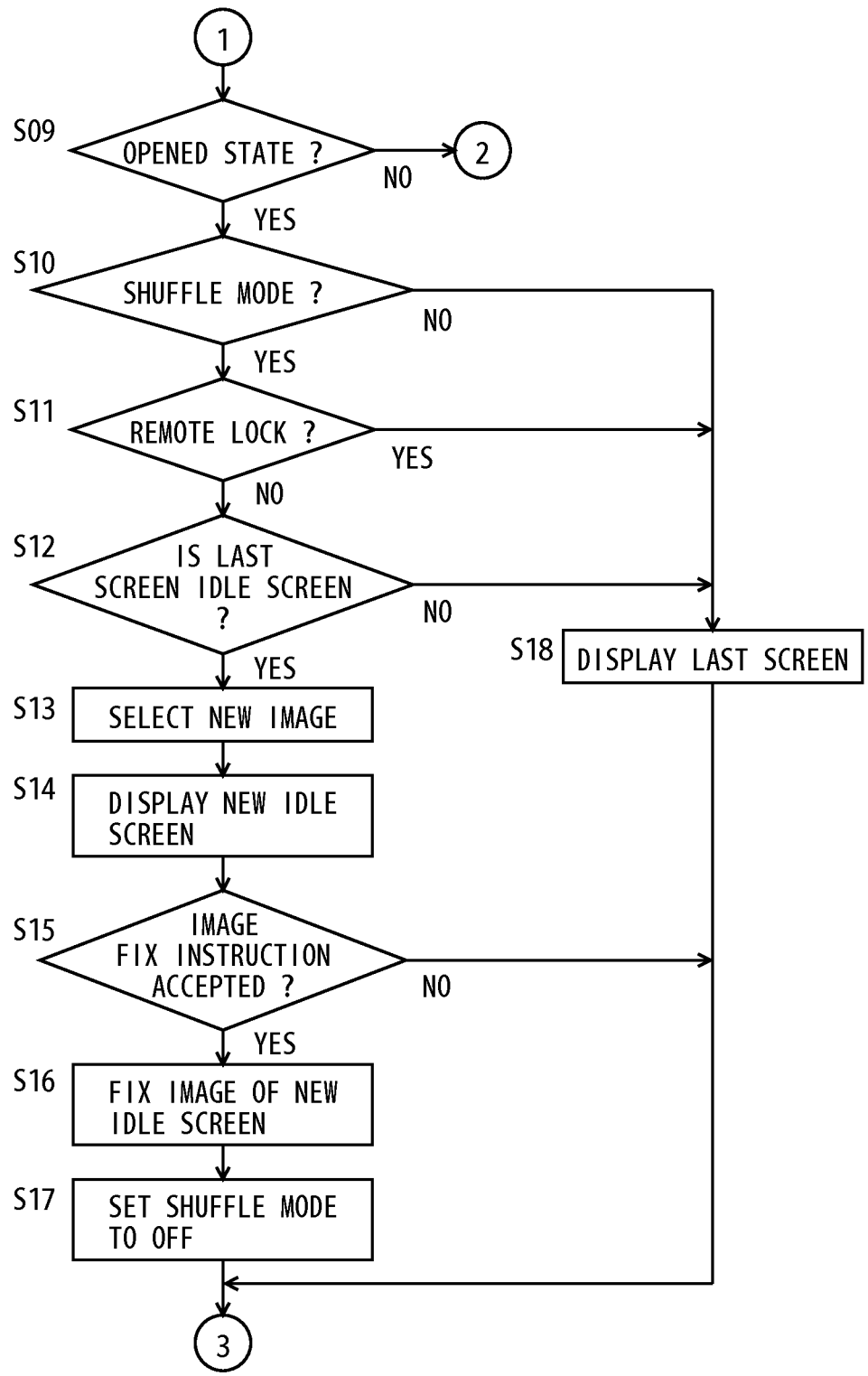
FIG. 6 is a second flow chart showing one example of the flow of the display control process.

FIGS. 5 and 6 are flow charts showing one example of the flow of a display control process. The display control process is the process executed by main control portion 21 as a result of main control portion 21 executing a display control program stored in flash memory 31. With reference to FIG. 5, main control portion 21 displays an idle screen on LCD 19 (step S01). In a step S02, it is determined whether the shape of mobile phone 1 is in its closed state or not. If the shape of mobile phone 1 is the closed state, the process proceeds to a step S03, but if not, the process proceeds to a step S21. In step S03, it is determined whether an operation has been accepted or not. If an operation has been accepted, the process proceeds to a step S04, but if not, the process proceeds to a step 505. If an operation is accepted in step S03, the process corresponding to the accepted operation is executed. In step S04, a process screen generated as a result of the process being executed is displayed on LCD 19, and the process returns to step S03.

In step S05, it is determined whether or not a sleep condition has been established in mobile phone 1. More specifically, it is determined whether or not a prescribed time period has elapsed since the operation was accepted in step S03. In other words, it is determined whether or not a prescribed time period has elapsed without an operation being accepted. If the sleep condition has been established, the process proceeds to a step S06, but if not, the process proceeds to a step S07. In step S06, the display of an image on LCD 19 is stopped. When the process proceeds to step S06, there are the case in which the process proceeds to it without an operation being accepted in step S03 and the case in which an operation is accepted in step S03 and the process proceeds to it after step S04 is executed. Consequently, at the point just before the display of the image is stopped in step S06, either one of the idle screen displayed in step S01 or in a step S08 described below and the process screen displayed in step S04 is displayed.

In step S07, it is determined whether a standby condition has been established or not. If the standby condition has been established, the process proceeds to step S08, but if not, the process proceeds to a step S09. The standby condition is the condition for mobile phone 1 to enter into a standby state. The standby state, here, is the state where wireless circuit 22 awaits the reception for a call to be transmitted or the reception of an electronic mail from a base station. In step S08, the idle screen is displayed on LCD 19, and the process returns to step S03.

With reference to FIG. 6, in step S09, it is determined whether mobile phone 1 has attained its opened state or not. Here, it is determined that mobile phone 1 has attained its opened state if the change in the output of closed sensor 29 from ON to OFF is detected. If it is determined that the shape of mobile phone 1 has attained the opened state, the process proceeds to a step S10, but if not, the process returns to step S03.

In step S10, it is determined whether the shuffle mode is set to ON or not. If the shuffle mode is set to ON, the process proceeds to a step S11, but if not, the process proceeds to a step S18. In step S18, the image displayed last on LCD 19 is displayed on LCD 19. In this case, if the display mode is the power saving mode, it is switched to the normal mode. Moreover, if the display mode is the normal mode, there is no change in the image being displayed on LCD 19.

In step S11, it is determined whether a remote lock is set or not. If the remote lock is not set, the process proceeds to a step S12, but if the remote lock is set, the process proceeds to step S18.

In step S12, it is determined whether the image displayed last on LCD 19 is an image of an idle screen or not. If the image displayed last on LCD 19 is the image of the idle screen, the process proceeds to a step S13, but if not, the process proceeds to step S18. The image displayed last is the idle screen displayed in step S01 or in step S08 or the process screen displayed in step S04. In addition, if it is after a step S26 had been executed, the image is the idle screen displayed in step S26, and if it is after a step S22 had been executed, the image is the process screen displayed in step S22.

In step S13, a new image is selected as a background image of the idle screen from a plurality of images stored in flash memory 31, and the process proceeds to a step S14. In this case, if the display mode is the power saving mode, it is switched to the normal mode. In step S14, a new idle screen including the image selected in step S13 in the background image is generated and is displayed on LCD 19.

In the next step S15, it is determined whether an image fix instruction has been accepted or not. The image fix instruction is an operation to be inputted into operation portion 25 by the user and is the operation of setting the background image included in the displayed idle screen as the fixed background image.

If the image fix instruction has been accepted, the process proceeds to a step S16, but if not, the process proceeds to a step S21. In step S16, the image of the new idle screen is fixed by setting the image included in the new idle screen displayed in step S14 as the background image predetermined in relation to the idle screen. In the next step S17, the shuffle mode is set to OFF, and the process proceeds to step S21.

On the other hand, in step S21, as in step S03, it is determined whether an operation has been accepted or not. If an operation has been accepted, the process proceeds to step S22, but if not, the process proceeds to a step S23. In step S22, as in step S04, a process screen displayed by the process executed according to the operation accepted in step S21 is displayed on LCD 19, and the process returns to step S21. In step S23, as in step S05, it is determined whether a sleep condition has been established or not. If the sleep condition has been established, the process proceeds to a step S24, but if not, the process proceeds to a step S25. In step S24, as in step S06, the display of LCD 19 is stopped, and the process returns to step S21. In this case also, in a similar manner, the image being displayed just before the display of LCD 19 is stopped is the image of the idle screen in some cases or the process screen displayed in step S22 in other cases.

In step S25, as in step S07, it is determined whether a standby condition has been established or not. If the standby condition has been established, the process proceeds to a step S26, but if not, the process proceeds to a step S27. In step S26, the idle screen is displayed, and the process returns to step S21. The idle screen displayed here is either the idle screen displayed in step S01 or the idle screen displayed in step S14. In step S27, it is determined whether the shape of mobile phone 1 has become the closed state or not. More specifically, it is determined that the shape of mobile phone 1 has attained the closed state by the detection of the output of closed sensor 29 switching from OFF to ON. If the shape of mobile phone 1 has attained the closed state, the process proceeds to step S03, but if not, the process returns to step S21.

In the case where the process proceeds to step S03, the state in which the idle screen displayed in step S01 or in step S26 or the process screen displayed in step S22 is being displayed on LCD 19 is maintained.

As described above, mobile phone 1 according to the present embodiment, in response to the change from the state in which the closed state is detected to the state in which the closed state is not detected while an image of an idle screen is being displayed, displays a new idle screen that includes in the background image a new image that was selected subsequent to the background image of the idle screen. Consequently, the image included in the idle screen can be altered by a simple operation of opening and closing the mobile communication device.

In addition, although the idle screen is not displayed while the display mode is switched to the power saving mode, if the image that had been displayed just before switching to the power saving mode was the image of the idle screen, an image of a new idle screen would be displayed which has a new image selected subsequent to the background image of the idle screen as the background image. Thus, the number of times the idle screen is altered may be increased.

Moreover, when the image of the idle screen is being displayed in the normal mode, and only when the image that had been displayed just before switching to the power saving mode was the image of the idle screen, an image of a new idle screen would be displayed which has a new image selected subsequent to the background image of the idle screen as a background image. In other words, when an image which is different from the idle screen is displayed, or when the display of the screen is discontinued while the idle screen was not being displayed, the new idle screen would not be displayed even when the state changes from the closed state to the non-closed state. Thus, the user may know that the image of the idle screen has changed.

Further, in the case where the state changes from the closed state to the state in which the closed state is not detected when the display mode is in the power saving mode, if the image that had been displayed just before switching to the power saving mode was not the image of the idle screen, the display mode is switched to the normal mode and the image that had been displayed before switching to the power saving mode is displayed. The image that was displayed in the closed state of mobile phone 1 would continue to be displayed even in the non-closed state. Thus, the user may have mobile phone 1 continue to execute the process that was being executed in its closed state also in its opened state.

Furthermore, when the remote lock is set to ON, the image of the idle screen that was displayed before the remote lock is set to ON is displayed in place of the image of a new idle screen. Thus, the viewing of a plurality of images stored in flash memory 31 by another can be prevented.

Moreover, although the example of mobile phone 1 is described as one example of a mobile communication device in the above-described embodiment, it goes without saying that the invention can be construed as the display control method to cause mobile phone 1 to execute the display control process shown in FIGS. 5 and 6 or as the display control program for causing main control portion 21 of mobile phone 1 to execute such display control method.

It is to be understood that the embodiment disclosed herein is in every aspect illustrative and non-limiting. The scope of the present invention is indicated not by the above description but by the description of the claims and is further intended to include the meaning equivalent to the claims and all modifications within the scope.

The invention claimed is:

1. A mobile communication device in which an upper portion and a lower portion open and close to allow a state to change to an opened state and to a closed state, comprising:
    an image storage portion to store a plurality of images;
    a selecting portion to select a target background image from said plurality of images stored;
    a closed state detection portion to detect the closed state; and
    a display control portion to control display of an image to display an image of an idle screen including said target background image selected by said selecting portion,
    wherein said display control portion displays, in response to a change from a state in which the closed state is detected by said closed state detection portion to a state in which the closed state is not detected while the image of said idle screen is being displayed, a new idle screen that includes a new target background image selected next in an order of selection by said selecting portion.

2. The mobile communication device according to claim 1, wherein said display control portion includes a mode switching portion to switch a display mode from a normal mode of displaying an image to a power saving mode of interrupting display of the image, and
    displays, if a change from a state in which the closed state is detected by said closed state detection portion to a state in which the closed state is not detected occurs while the display mode is switched to said power saving mode, and on the condition that the image which had been displayed just before switching to said power saving mode is an image of said idle screen, an image of a new idle screen which includes a new target background image selected by said selecting portion.

3. The mobile communication device according to claim 2, wherein said display control portion displays an image of said new idle screen only when a change from a state in which the closed state is detected by said closed state detection portion to a state in which the closed state is not detected occurs while the image of said idle screen is being displayed while said display mode is switched to the normal mode, and when a change from a state in which the closed state is detected by said closed state detection portion to a state in which the closed state is not detected occurs and only when the image that had been displayed just before switching to said power saving mode is the image of said idle screen while said display mode is switched to the power saving mode.

4. The mobile communication device according to claim 2, wherein said display control portion, when a change from a state in which the closed state is detected by said closed state detection portion to a state in which the closed state is not detected occurs while the display mode is switched to said power saving mode, and if the image that had been displayed just before switching to said power saving mode is not the image of said idle screen, switches the display mode to the normal mode and displays the image that had been displayed before switching to said power saving mode in response to the change from a state in which the closed state is detected by said closed state detection portion to a state in which the closed state is not detected.

5. The mobile communication device according to claim 1, further comprising:
    a communication portion to communicate with an external device;
    an operation accepting portion to accept an operation by a user; and
    an operation lock portion to render invalid a prescribed operation inputted into said operation accepting portion based on a command received from said external device via said communication portion,
    wherein when said prescribed operation is rendered invalid by said operation lock portion, said display control portion displays the image of said idle screen that was displayed before said prescribed operation was rendered invalid by said operation lock portion in place of the image of said new idle screen.

6. A display control method to be executed by a mobile communication device in which an upper portion and a lower portion open and close to allow a state to change to an opened state and to a closed state, wherein said mobile communication device includes an image storage portion to store a plurality of images, said display control method comprising the steps of:
    selecting a target background image from said plurality of images stored;
    detecting said closed state; and
    displaying, in response to a change to a state in which the closed state is not detected in the step of detecting said closed state when the closed state is being detected in the step of detecting said closed state and while an image of an idle screen including said target image selected in said selecting step is being displayed, a new idle screen that includes a new target background image selected next in an order of selection in said selecting step.

7. The display control method according to claim 6, wherein said displaying step includes a step of switching a display mode from a normal mode of displaying an image to a power saving mode of interrupting display of the image, and
   a step of displaying, if a change from a state in which the closed state is detected in the step of detecting said closed state to a state in which the closed state is not detected occurs while the display mode is switched to said power saving mode, and on the condition that the image which had been displayed just before switching to said power saving mode is an image of said idle screen, an image of a new idle screen which includes a new target background image selected in said selecting step.

8. The display control method according to claim 7, wherein said displaying step includes a step of displaying an image of said new idle screen only when a change from a state in which the closed state is detected in the step of detecting said closed state to a state in which the closed state is not detected occurs while the image of said idle screen is being displayed while said display mode is switched to the normal mode, and when a change from a state in which the closed state is detected in the step of detecting said closed state to a state in which the closed state is not detected occurs and only when the image that had been displayed just before switching to said power saving mode is the image of said idle screen while said display mode is switched to the power saving mode.

9. The display control method according to claim 7, wherein said displaying step includes, when a change from a state in which the closed state is detected in the step of detecting said closed state to a state in which the closed state is not detected occurs while the display mode is switched to said power saving mode, and if the image that had been displayed just before switching to said power saving mode is not the image of said idle screen, a step of switching the display mode to the normal mode and displaying the image that had been displayed before switching to said power saving mode in response to the change from a state in which the closed state is detected in the step of detecting said closed state to a state in which the closed state is not detected.

10. The display control method according to claim 6, wherein said mobile communication device further includes:
    a communication portion to communicate with an external device; and
    an operation accepting portion to accept an operation by a user,
    said display control method further comprising the step of rendering invalid a prescribed operation inputted into said operation accepting portion based on a command received from said external device via said communication portion,
    wherein when said prescribed operation is rendered invalid in the step of rendering the operation invalid, said displaying step includes a step of displaying the image of said idle screen that was displayed before said prescribed operation was rendered invalid in said step of rendering the operation invalid in place of the image of said new idle screen.

11. A display control program to be executed by a computer that controls a mobile communication device in which an upper portion and a lower portion open and close to allow a state to change to an opened state and to a closed state, wherein said mobile communication device includes an image storage portion to store a plurality of images, and wherein said display control program causes said computer to execute the steps of:
    selecting a target background image from said plurality of images stored;
    detecting said closed state; and
    displaying, in response to a change to a state in which the closed state is not detected in the step of detecting said closed state when the closed state is being detected in the step of detecting said closed state and while display of an image of an idle screen including said target image selected in said selecting step is being displayed, a new idle screen that includes a new target background image selected next in an order of selection in said selecting step.

12. The display control program according to claim 11, wherein said displaying step includes a step of switching a display mode from a normal mode of displaying an image to a power saving mode of interrupting display of the image, and
    a step of displaying, if a change from a state in which the closed state is detected in the step of detecting said closed state to a state in which the closed state is not detected occurs while the display mode is switched to said power saving mode, and on the condition that the image which had been displayed just before switching to said power saving mode is an image of said idle screen, an image of a new idle screen which includes a new target background image selected in said selecting step.

13. The display control program according to claim 12, wherein said displaying step includes a step of displaying an image of said new idle screen only when a change from a state in which the closed state is detected in the step of detecting said closed state to a state in which the closed state is not detected occurs while the image of said idle screen is being displayed while said display mode is switched to the normal mode, and when a change from a state in which the closed state is detected in the step of detecting said closed state to a state in which the closed state is not detected occurs and only when the image that had been displayed just before switching to said power saving mode is the image of said idle screen while said display mode is switched to the power saving mode.

14. The display control program according to claim 12, wherein said displaying step includes, when a change from a state in which the closed state is detected in the step of detecting said closed state to a state in which the closed state is not detected occurs while the display mode is switched to said power saving mode, and if the image that had been displayed just before switching to said power saving mode is not the image of said idle screen, a step of switching the display mode to the normal mode and displaying the image that had been displayed before switching to said power saving mode in response to the change from a state in which the closed state is detected in the step of detecting said closed state to a state in which the closed state is not detected.

15. The display control program according to claim 11, wherein said mobile communication device further includes:
    a communication portion to communicate with an external device; and
    an operation accepting portion to accept an operation by a user,
    said display control program further comprising the step of rendering invalid a prescribed operation inputted into said operation accepting portion based on a command received from said external device via said communication portion, wherein when said prescribed operation is rendered invalid in the step of rendering the operation invalid, said displaying step includes a step of displaying the image of said idle screen that was displayed before said prescribed operation was rendered invalid in said step of rendering the operation invalid in place of the image of said new idle screen.

* * * * *